United States Patent

[11] 3,629,816

| [72] | Inventor | Arden G. Gillund<br>Oak Creek, Mich. |
|---|---|---|
| [21] | Appl. No. | 62,381 |
| [22] | Filed | Aug. 10, 1970 |
| [45] | Patented | Dec. 21, 1971 |
| [73] | Assignee | General Motors Corporation<br>Detroit, Mich. |

[54] AIR CUSHION ACTUATION AND MONITORING CIRCUIT
10 Claims, 5 Drawing Figs.

[52] U.S. Cl. .................................................. 340/61,
180/103, 324/51, 340/214
[51] Int. Cl. .................................................... B60q 3/04,
G08b 19/00
[50] Field of Search ........................................... 340/61,
214, 248 A; 180/103; 324/51; 320/1

[56] References Cited
UNITED STATES PATENTS

| 2,961,583 | 11/1960 | Sorensen ........................ | 320/1 |
|---|---|---|---|
| 3,122,729 | 2/1964 | Bothwell et al. ............... | 340/248 A |
| 3,193,748 | 7/1965 | Langan .......................... | 320/1 |
| 3,549,169 | 12/1970 | Oldberg et al. ............... | 180/103 |
| 3,552,768 | 1/1971 | Kaiser ........................... | 180/103 |
| 3,556,556 | 1/1971 | Goetz ............................ | 180/103 |

Primary Examiner—John W. Caldwell
Assistant Examiner—Glen R. Swan, III
Attorneys—Eugene W. Christen, Creighton R. Meland and Albert F. Duke ABSTRACT: A control circuit for actuating an inflatable air cushion in a motor vehicle includes an electrically operated actuator connected between a pair of normally open acceleration responsive switches. A storage capacitor connected to the switches is discharged through the actuator upon acceleration or deceleration of the vehicle in excess of a predetermined magnitude and duration. Malfunction of either of the acceleration responsive switches or the storage capacitor is detected on a continuous basis by monitoring the voltage at a junction between the actuator and one of the switches and comparing the voltage at the monitored junction with upper and lower reference levels. Both analog and digital embodiments of the invention are disclosed.

PATENTED DEC 21 1971 3,629,816

INVENTOR.
Arden G. Gillund
BY
Albert H. Duke
ATTORNEY 3,629,816

AIR CUSHION ACTUATION AND MONITORING CIRCUIT

BACKGROUND OF THE INVENTION

This invention relates to a control circuit for actuating an air cushion positioned within a motor vehicle and more particularly to a control circuit including means for continuously monitoring for a malfunction in the control circuit.

It is an object of the present invention to provide an air cushion actuation control circuit which includes means for continuously monitoring for abnormal conditions in the circuit to thereby immediately inform the vehicle operator of a malfunction.

SUMMARY OF THE INVENTION

In accordance with the present invention, the actuator for effecting inflation of the air cushion is connected between a pair of acceleration responsive switches which are in turn connected across a storage capacitor. The storage capacitor is connected to a source of charging potential and upon simultaneous closure of the acceleration responsive switches discharges through the actuator thus causing the air cushion to inflate. Since the storage capacitor is essential to the operation of the circuit it is desirable to continuously monitor the condition of the capacitor to determine if the requisite charge is stored. It is also desirable to monitor the condition of the acceleration responsive switches. If one of the switches becomes shorted the actuator would be under the complete control of the other switch and the potential for inadvertent inflation of the air cushions would be significantly increased. One embodiment of the present invention includes monitoring circuitry for comparing the voltage at a junction between the actuator and one of the acceleration responsive switches with upper and lower voltage levels established by a voltage-divider network in the control circuit. Under normal conditions, the voltage at the monitored junction is between the upper and lower reference voltage levels, however, upon shorting of the capacitor or one of the switches, the voltage at the monitored junction wither exceeds or drops below the upper and lower reference levels respectively. This variation in the voltage at the monitored junction is utilized to energize an indicator lamp to inform the vehicle operator of a malfunction. A second embodiment of the present invention includes a clock source connected at a junction between the other acceleration responsive switch and the actuator. Under normal conditions the voltage at the monitored junction is the pulsating voltage output of the clock. If one of the acceleration responsive switches becomes shorted the voltage at the monitored junction will remain at a constant high level while if the other acceleration responsive switch becomes shorted, the voltage at the monitored junction will remain at a constant low value. Logic circuitry responsive to the voltage at the monitored junction and the clock output provides an output under either condition of switch malfunction which is utilized to energize an indicator lamp to inform the operator of the vehicle of the malfunction. In addition, the logic circuitry senses the voltage at the storage capacitor and provides the aforementioned output whenever the capacitor is in a discharge condition.

BRIEF DESCRIPTION OF THE DRAWING

A more complete understanding of the present invention may be had from the following detailed description which should be read in conjunction with the drawings in which.

DESCRIPTION OF THE PREFERRED EMBODIMENTS

Figure 1:
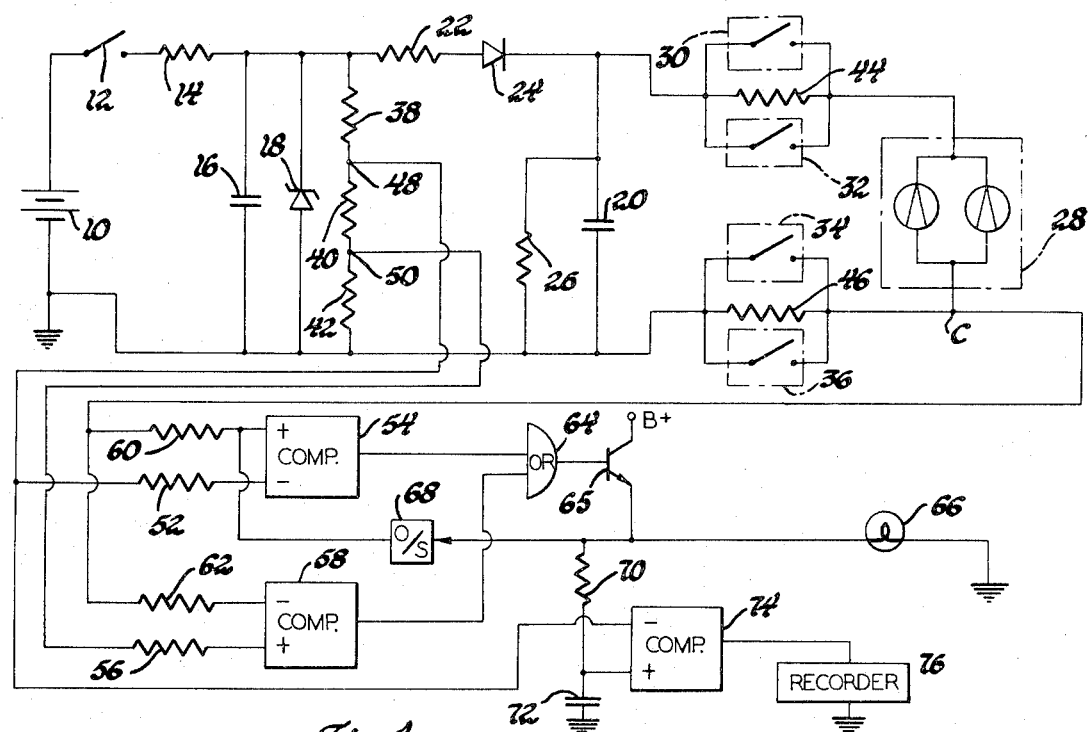
FIG. 1 is a schematic diagram of one embodiment of the circuit of the present invention.

Referring now to the drawings and initially to FIG. 1, a source of electrical power such as the vehicle battery 10 is shown to have a positive terminal connected with a manually operable on/off switch such as the vehicle ignition switch 12 and a negative terminal connected to a reference potential such as ground. A filter network comprising a resistor 14 and a capacitor 16 and a voltage regulator comprising a zener diode 18 are connected with the source 10 through the ignition switch 12. A storage capacitor 20 is connected across the zener diode 18 through a charging resistor 22 and a diode 24. The diode 24 prevents discharge of the capacitor 20 in the event the battery 10 should become disconnected or shorted to ground. A resistor 26 is connected parallel with the capacitor 20 to provide discharge path for the capacitor 20 upon opening of the ignition switch 12. Actuator means such as the redundant parallel connected squibs 28 are connected across the capacitor 20 through parallel connected condition responsive switches 30, 32, and 34, 36. The conductors connecting the squibs 28 to the switches 30, 32 and 34, 36 are shielded from radio frequency interference to prevent inadvertent firing of the squibs 28. The switches 30 and 34 are normally open acceleration responsive switches which close when the vehicle is subjected to acceleration or deceleration in excess of a predetermined magnitude and time duration such as would occur during a collision. A suitable acceleration sensor is described in copending application Ser. No. 35,674, filed May 8, 1970, entitled SENSOR by Arden G. Gillund and assigned to the assignee of the present invention. Switches 32 and 36 respond to roll over of the vehicle and may be any suitable attitude-responsive switch which closes when the vehicle is inclined from the horizontal by a predetermined amount. Simultaneous closure of one of the switches 30, 32, and 34, 36 will discharge the capacitor 20 to fire the squibs 28 and actuate apparatus for inflating the air cushion. As is well known in the art, the firing of the squibs 28 may be utilized to rupture the diaphragm of the sealed pressure vessel thereby inflating an associated air cushion. Further details regarding a suitable apparatus for inflating an air cushion in response to firing of the squibs 28 may be found in copending patent application Ser. No. 36,080, filed May 11, 1970, entitled Occupant Restraint, assigned to the assignee of the present invention.

The circuit further includes serially connected voltage divider resistors 38, 40 and 42 connected across the zener diode 18 and resistors 44, and 46 connected in parallel with the switches 30, 32 and 34, 36 respectively. The resistors 38, 40 and 42 establish upper and lower reference voltage levels at the junctions 48 and 50. The upper and lower reference voltage levels may, for example, be an upper level of 9 volts and a lower level of 3 volts. The junction 48 is connected through an isolating resistor 52 to one input of a comparator 54 while the junction 50 is connected through an isolating resistor 56 as one input to a comparator 58. The other input to comparators 54 and 58 is provided by the voltage at the junction C through isolating resistors 60 and 62. When the voltage at the junction C is above 9 volts the comparator 54 provides an input to an OR-gate 64. When the voltage at the junction C is below 3 volts, the comparator 58 provides an input to the OR-gate 64. The output of the OR-gate 64 is connected to the base of a transistor 65 which has its collector connected to the battery 10 and its emitter connected to ground through an indicator lamp 66. The emitter of the transistor 65 is also connected to a 5-second one-shot multivibrator 68 having its output connected as one input to the comparator 54. The emitter of transistor 65 is also connected through a RC time delay network comprising a resistor 70 and a capacitor 72. The junction between the resistors 70 and a capacitor 72 is connected to one input of a comparator 74 while the other input of the comparator 74 is connected to the junction 48. The output of the comparator 74 is connected to a recorder 76.

The operation of the circuit of FIG. 1 will now be described. Upon closure of the ignition switch 12, the capacitor 20 begins to charge. Initially the point C is below the 3 volt level established at the junction 50 so that an output is obtained from the comparator 58 which enables the OR-gate 64 to render the transistor 65 conductive. When the transistor 65 conducts the lamp 66 is energized and the one-shot multivibrator 68 is actuated which provides an input to the comparator 54 for a 5-second interval of time. Actuation of the one-shot multivibrator 68 raises one input to comparator 54 above the 9 volt reference established at the junction 48 thereby enabling the OR-gate 64 insuring that the transistor 65 remains conductive and, therefore, that the indicator lamp 66 remains energized for the interval of time established by the one-shot multivibrator 68 even though the input to the OR-gate 64 from the comparator 58 is removed when the voltage at the junction C rises above the 3 volt reference level as a result of the charging of capacitor 20.

After the 5-second interval of time established by the one-shot multivibrator 68, the input to the comparator 54 from the one-shot multivibrator 68 is removed which removes the input to the OR-gate 64 from the comparator 54. As the capacitor 20 charges the voltage at the junction C will rise above the 3 volt level established at the junction 50 prior to completion of the 5-second delay provided by the one-shot multivibrator 68 thereby removing the other input to the OR-gate 164 provided by the output of the comparator 58. Thus after the 5-second interval of time, the transistor 65 is turned off deenergizing the indicator lamp 66. In the absence of a malfunction in the circuit the voltage to the junction C remains at a level between the 3 volt and 9 volt levels established at the junctions 50 and 48 respectively. However, if the capacitor 20 becomes shorted the voltage at the junction C would drop below the 3 volt level at the junction 50 energizing the lamp 66 in the manner described above in connection with the initial charging of capacitor 20. However, since the voltage of the junction C will now remain at a level below the 3 volt level at the junction 50, the input to the OR-gate 68 provided by the comparator 58 will remain following the 5-second interval determined by the one-shot multivibrator 68. Consequently, the transistor 65 will continue to conduct and the lamp will remain energized. When the capacitor 72 charges above the 9 volt reference input to the comparator 74, the comparator 74 provides an output to energize the recorder 76 to provide a permanent record of the malfunction. The time required to charge the capacitor 72 through the resistor 70 is greater than the 5-second time interval established by the one-shot multivibrator 68 so that the recorder is not energized during the initial charging of the capacitor 20 or in the event of a momentary malfunction which corrects itself during the 5-second interval. The operator is still, however, informed of the momentary malfunction by the 5-second energization of the lamp 66. The recorder 76 may be any suitable device which will provide a permanent record of an output from the comparator 74 such as for example, a common fuse.

Should one of the switches 34, 36 become shorted, or should the shielded cable leading to the squibs 28 open circuit or short circuit, the voltage at the junction C will drop below 3 volts and the same sequence of events previously described in connection with the shorting of the capacitor 20 will occur. On the other hand, if one of the switches 30, 32 becomes shorted, the voltage at the junction C will rise above the 9 volt level established at the junction 48. Such occurrence will provide an input to the OR-gate 64 from the comparator 54 rendering the transistors 65 conductive and energizing the lamp 66. In each instance of switch or shielded cable malfunction, the recorder 76 would be energized after the time delay established by the resistor 70 and capacitor 72.

Figure 2:
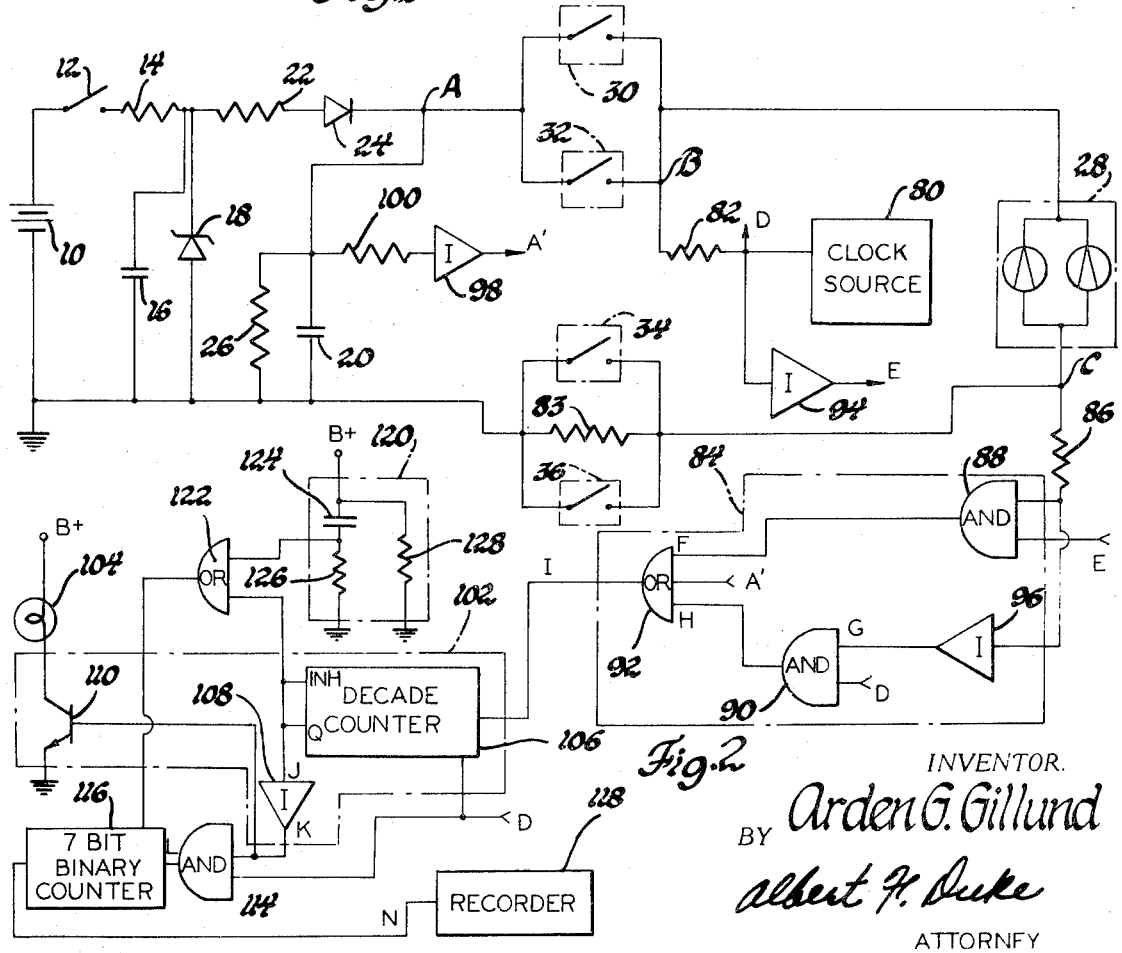
FIG. 2 is a schematic diagram of a second embodiment of the circuit of the present invention.

Referring now to FIG. 2, there is shown another embodiment of the invention. The basic circuit for actuating the squibs 28 is identical to that shown in FIG. 1 and the corresponding components are designated by corresponding reference numerals. In FIG. 2, a 0.5-second clock source 80 is connected through an isolating resistor 82 to a junction designated B between the squibs 28 and the switches 30, 32. A resistor 83 is connected in parallel with the switches 34, 36 to insure that junction C is a ground potential in the event squib 28 or the squib cables become open circuited. Logic circuitry generally designated 84 is connected to the junction C through a resistor 86 and comprises AND-gates 88 and 90 and an OR-gate 92. One input of the AND-gate 88 is connected to the junction C through the resistor 86 while the other input to the AND-gate 88 is connected through an inverter 94 to the clock 80. One input of the AND-gate 90 is connected to the clock 80 while the other input is connected through an inverter 96 and resistor 86 to the junction C. The outputs of the AND-gates 88 and 90 provide inputs to the OR-gate 92. A third input to the OR-gate 92 is obtained through an inverter 98 and a resistor 100 connected to the capacitor 20.

The output of the OR-gate 92 is connected to control switch means generally designated 102 to control the energization of an indicator lamp 104. The control switch means 102 comprises a decade counter 106 having its reset terminal connected with the output of the OR-gate 92 and its output terminal Q connected to an inverter 108 to the base of a transistor 110. The collector of the transistor 110 is connected to the battery 10 through the indicator lamp 104 while the emitter of the transistor 110 is grounded. When a logic "one" input is applied to the reset terminal of the decade counter 106 a logic "zero" output is obtained at the output terminal Q. The clock terminal of the decade counter 106 is connected to the clock source 80 so that the output at terminal Q switches to a logic "one" upon the application of ten pulses to the clock input. The output terminal Q is connected to the inhibit terminal of the decade counter 106 to prevent a transition of the logic level at the output terminal Q from the logic "one" to a logic "zero" until a logic "one" is received at the reset terminal. Thus, while the counter 106 may be clocked to switch the Q terminal output from a logic "zero" to a logic "one" it cannot be clocked to switch from a logic "one" to a logic "zero" but rather must be reset to the logic "zero" state.

The output of the inverter 108 also provides one input to AND-gate 114 which has its other input connected with the clock 80. The output of the AND-gate 114 is connected to the clock input of a seven-bit binary counter 116 which serves to energize a recorder 118. The rest terminal of the counter 116 is connected to a reset generator 20 and to the output terminal Q of the counter 106 through an OR-gate 122. The reset generator 120 comprises a capacitor 124 and a resistor 126 connected across the battery 10 and provides a pulse to reset the counter 116. A resistor 128 is connected in parallel with the capacitor 124 to provide a discharge path for the capacitor 124 upon opening of the ignition switch 12.

Figure 3:
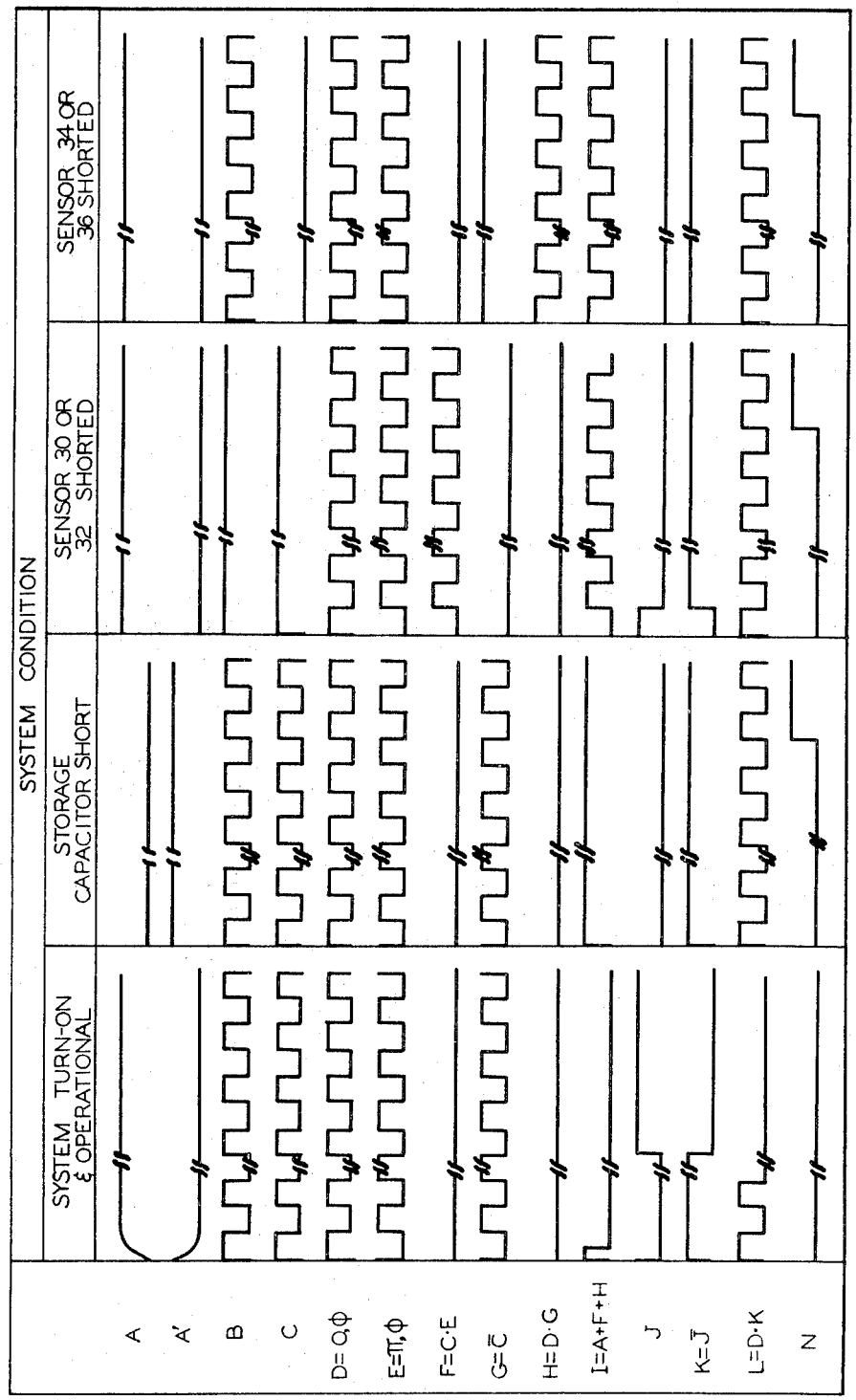
FIG. 3 shows waveforms consisting at various junctions in the circuit of FIG. 2.

The operation of the circuit will now be described with reference to FIG. 3 which shows waveforms of the various designated junctions in the circuit of FIG. 2. Referring to column one of the waveforms, when ignition switch 12 is closed the counter 116 is reset to a logic "zero" output by a pulse from the reset generator 120 and the capacitor 20 begins to charge through the resistor 22 is shown in waveform A. The time constant of the RC circuit comprising capacitor 124 and resistor 126 is much shorter than the time constant of the RC circuit comprising resistor 22 and capacitor 20 so that prior to completion of charging of the capacitor 20 the capacitor 124 is charged and the reset pulse to the counter 116 is removed permitting the counter 116 to be clocked from the clock 80 when the AND-gate 114 is enabled. The voltage of the output of the inverter 98 is a reversal of that at the junction A as shown in waveform A' so that initially a logic "one" is applied to the reset terminal of counter 106 producing a logic "zero" at the output terminal Q. The output at the terminal Q is inverted by the inverter 108 to render the transistor 110 conductive and energize the indicator lamp 104. At the same time, and AND-gate 14 is enabled and clock pulses form the clock 80 as shown in waveform D clock the counter 116. When the capacitor 20 has charged to a level such that the input to the OR-gate 92 falls below the threshold level of the OR-gate 92, the input to the reset terminal of decade counter 106 is removed as shown in waveform I and the counter 106 is clocked from the clock 80. Upon receipt of 10 clock pulses the output at the terminal Q is switched to a logic "one" as shown in waveform J which resets the counter 116 and is inverted by the inverter 108 to disable the gate 114, render the transistor 110 nonconductive, and deenergize the lamp 104. Since the seven-bit binary counter 116 requires passage of 64 clock pulses through the AND-gate 114 to switch it's output from a logic "zero" to a logic "one," it will be apparent that if the capacitor 20 is properly storing a charge the AND-gate 114 will be disabled by the decade counter 106 prior to the 32 second interval represented by the 64 pulses required at the counter 116. Accordingly, the recorder 118 will not be activated. If on the other hand, the capacitor 20 is not storing a charge or if at any time the capacitor 20 should become shorted, the logic "one" input to the reset terminal of the decade counter 106, as shown in waveform I, column two, will keep the AND-gate 114 enabled for the requisite 32-second time interval required to provide an output at the counter 116, as shown in waveform N, to energize the recorder 118.

If under normal noncollision conditions the switches 30, 32, 34 and 36 are properly functioning, i.e. are in an open circuit condition, the output of the clock 80 shown at waveform D, column one appears at the junction C and is applied to the AND-gate 88 aNd through the inverter 96 to the AND-gate 90. Since the inputs to the AND-gates 88 and 90 under these conditions are out of phase by 180°, a logic "zero" appears at the outputs of AND-gates 88 and 90 as shown in waveforms F and H. Should one of the sensors 30 and 32 become shorted the voltage at the junction C will be a constant voltage representing a logic "one," as shown in waveform C, column three, which will be applied as one input to AND-gate 88. The voltage at junction C will thus enable the AND-gate 88 but will disable the AND-gate 90 since the logic "one" at junction C is inverted by the inverter 96 to provide a logic "zero" input to the AND-gate 90, as shown in waveform G. Thus, a train of clock pulses from the output of inverter 94 are fed through AND-gate 88 and OR-gate 92 to provide a pulsating logic input to the counter 106, as shown in waveform I. If on the other hand, one of the sensors 34, 36 becomes shorted, or the shielded cable open circuits or short circuits, the voltage at the junction C is a constant logic "zero," as shown in waveform C, column four, which disables the AND-gate 88 and is inverted to a logic "one" by the inverter 96 to enable the AND-gate 90. Thus a train of clock pulses from the output of the clock 80 are fed through the AND-gate 90 and OR-gate 52 to the reset terminal of counter 106, as shown in waveform I. From the above it will be apparent that the output of the logic circuitry 84 is logic "zero" if the switches 30, 32, 34 and 36 are properly functioning and the output switches between alternate binary logic levels when a malfunction occurs, in any of the switches 30, 32, 34 or 36. Since the counter 106 is reset at the pulse rate of the clock 80 during a malfunction of one of the switches 30–36, it will be understood that the counter 106 will not be clocked to produce a logic "one" output at the terminal Q. Consequently, after the period established by the counter 116 the recorder 118 will be energized.

Having described my invention what I claim is:

1. In a passenger conveyance provided with a safety device adapted to be actuated by electrically operated actuator means, a control circuit for operating said actuator means comprising a storage capacitor, means for charging said capacitor, first and second normally open condition responsive switch means connected to opposite sides of said actuator means and to said capacitor providing a discharge path for said capacitor through said actuator means upon closure of both of said switch means, monitoring means for continuously monitoring for a malfunction of said switch means and comprising detection means responsive to the voltage at a junction between said actuator means and one of said switch means for providing an output indicative of a constant voltage at said junction of either one of two predetermined level, indicator means, control switch means responsive to the output of said detection means for energizing said indicator means and including first time delay means for maintaining the energization of said indicator means for a fixed interval of time, recorder means, second time delay means energizable concurrently with said indicator means for actuating said recorder means, the time interval of said second time delay means being greater than said fixed interval of time.

2. In a passenger conveyance provided with a safety device adapted to be actuated by electrically operated actuator means, a control circuit for operating said actuator means comprising a storage capacitor, means for charging said capacitor, first and second normally open condition responsive switch means connected to opposite sides of said actuator means and to said capacitor for providing a discharge path for said capacitor through said actuator means upon closure of both of said switch means, malfunction detection means comprising voltage-divider means connected in parallel with said capacitor and providing first and second reference voltage junctions, resistor means establishing a parallel current path with each of said first and second switch means and an output terminal connected to the reset terminal of said counter, indicator means, means for comparing the voltage at said first and second reference junctions with the voltage at said monitoring junction and for energizing said indicator means when the voltage at said monitoring junction either exceeds the voltage at said first reference junction or drops below the voltage at said second reference junction.

3. The control circuit of claim 2 further comprising means energizable concurrently with said indicator means for insuring energization of said indicator means for a fixed interval of time.

4. The control circuit of claim 3 further comprising recorder means, time delay means energizable concurrently with said indicator means for actuating said recorder means, the time interval of said time delay means being greater than said fixed interval of time.

5. In a passenger conveyance provided with a safety device adapted to be actuated by electrically operated actuator means, a control circuit for operating said actuator means comprising a storage capacitor, means for charging said capacitor, first and second normally open condition responsive switch means connected to opposite sides of said actuator means and to said capacitor for providing a discharge path for said capacitor through said actuator means upon closure of both of said switch means, malfunction detection means comprising clock means connected to a first junction between said first switch means and said actuator means, gate means connected to said clock means and to a second junction between said actuator means and said second switch means for providing one binary logic level output when a pulsating voltage occurs at said second junction and alternate binary level outputs when a constant voltage indicative of a switch means malfunction occurs at said second junction, indicator means, and control switch means for energizing said indicator means in response to said alternate binary logic level outputs from said gate means.

6. The control circuit of claim 5 further including recorder means for providing a permanent record of said malfunction and time delay means connecting said recorder means to said control switch means for activating said recorder means.

7. The control circuit of claim 5 wherein said clock means provides two output signals phase displaced by 180°, said gate means comprises first and second logical AND function gates and a logic OR function gate, means connecting respective inputs of said OR gate to respective outputs of said first and second AND gates, means connecting one input of said first and second AND gates, to respective ones of said clock outputs, and means connecting the other input of said first AND gate to said second junction, inverter means connecting the other input of said second AND gate to said second junction.

8. The control circuit of claim 7 further including means connecting a junction between said capacitor and said first switch means to a third input to said OR gate to produce the other of said binary logic level outputs during the charging of said capacitor and in the event of a short circuit of said capacitor.

9. The control circuit of claim 8 wherein said control switch means comprises time delay means adapted to provide one binary logic level output in response to said other binary logic level output of said OR gate, the time interval of said delay means between switching from said one binary logic level to the other binary logic level being greater than the switching rate of said clock means.

10. The circuit of claim 9 wherein said time delay means comprises a first counter having a reset input connected to the output of said OR gate a clock input connected to one of said outputs of said clock means, an output terminal and an inhibit terminal connected to said output terminal, said control switch means further comprising a transistor having emitter and collector electrodes connected in series with said indicator means and a base electrode connected to said output terminal, said circuit further comprising recorder means for providing a permanent record of a malfunction, a third logical AND function gate having one input connected to one of said outputs of said clock means, means connecting the other input of said third AND gate to the output terminal of said counter, a second counter having a clock terminal connected to the output terminal of said third AND gate, an output terminal connected to said recorder means, and a reset terminal, a reset generator, a second logical OR function gate having input terminals connected to said reset generator and the output terminal of said first counter and normally establishing a voltage at a monitoring junction between said actuator means and one of said first and second switch means which is less than the voltage at said first reference voltage and greater than the voltage at said second reference voltage junction whereby said second counter is reset prior to said capacitor being charged to its normal firing potential and said recorder is activated a predetermined interval of time after continuous energization of said indicator means.

* * * * *

PO-1050
(5/69)

UNITED STATES PATENT OFFICE
CERTIFICATE OF CORRECTION

Patent No. 3,629,816          Dated   December 21, 1971

Inventor(s)  Arden G. Gillund

It is certified that error appears in the above-identified patent and that said Letters Patent are hereby corrected as shown below:

In the Claims, Column 6, Claim 2, lines 21 and 22, delete "and an output terminal connected to the reset terminal of said counter," and insert -- and normally establishing a voltage at a monitoring junction between said actuator means and one of said first and second switch means which is less than the voltage at said first reference voltage and greater than the voltage at said second reference voltage junction, --; Column 8, Claim 10, lines 10 through 14, delete "and normally establishing a voltage at a monitoring junction between said actuator means and one of said first and second switch means which is less than the voltage at said first reference voltage and greater than the voltage at said second reference voltage junction," and insert -- and an output terminal connected to the reset terminal of said counter --.

Signed and sealed this 19th day of February 1974.

(SEAL)
Attest:

EDWARD M. FLETCHER, JR.
Attesting Officer

C. MARSHALL DANN
Commissioner of Patents